Patented Oct. 16, 1923.

1,470,656

UNITED STATES PATENT OFFICE.

WILHELM TRAUBE, OF BERLIN, GERMANY.

PROCESS FOR THE PRODUCTION OF ETHYL CHLORIDE.

No Drawing. Application filed February 4, 1922. Serial No. 534,207.

*To all whom it may concern:*

Be it known that I, WILHELM TRAUBE, citizen of Germany, residing at Berlin, in Prussia, Germany, have invented new and useful Improvements in a Process for the Production of Ethyl Chloride, of which the following is a specification.

This invention relates to a process for the production of ethyl chloride.

At the decomposition of the chlorsulphonic ethyl ester $ClSO_3C_2H_5$, with water, which according to Müller (Berichte der deutschen chemischen Gesellschaft, Volume VI, page 229) takes place with formation of alcohol, sulphuric acid and hydrochloric acid, the ethyl chloride, $C_2H_5Cl$, is produced as a by product, as has been shown by Bushong (Amer. chem. Journ. XXX, page 212), in a quantity of approximately 16% of the theoretically possible quantity. According to Müller considerable quantities of ethyl chloride are produced also if a concentrated aqueous or alcoholic solution of caustic potash is made to act upon the chlorsulfonic ethyl ester and further by the action of zinc powder and water upon the same. If the chlorsulfonic ethyl ester is mixed with alcohol considerable quantities of ethyl chloride are produced besides ethyl ether and hydrochloric acid and eventually ethyl sulphate, as has been shown by Claesson (Journal für praktische Chemie, vol. 19, page 231).

But with all these known methods the output in ethyl chloride is bad and largely below the theoretically possible output so that in most cases the technical production of the ethyl chloride would not be remunerative in such a manner. It has to be considered further that the chemical substances used in these known methods are partly expensive and partly are difficult to regenerate.

I now have found that hydrochloric acid decomposes the chlorsulphonic ethyl ester in such a manner that ethyl chloride is produced in a very good output, sulphuric acid being produced at the same time. If concentrated hydrochloric acid is employed, the output in ethyl chloride corresponds with the theoretically possible quantity. In this manner it has become possible to produce cheaply and without alcohol the ethyl chloride which has been hitherto technically produced from alcohol and which is used for many technical purposes, for instance as anesthetic, as ethylising substance in the dye industry and recently also for the production of ethyl cellulose.

This manufacturing method of the ethyl chloride is rendered particularly economical by the fact that the chlorsulphonic ethyl ester is made accessible easily and in a cheap manner, by treating with chlorsulphonic acid the gases which contain ethylene in small quantities, such as coke-oven gases, brown-coal gases and the like, according to my prior U. S. application filed June 28th, 1920 (Serial Number 392,440). According to this process the ethylene is absorbed completely from the gases, which contain the same in a highly diluted state, by chlorsulphonic acid already in the cold or at ordinary temperature, the chlorsulphonic ethyl ester being formed thereby.

It is advantageous to combine this process for the production of the chlorsulphonic ethyl ester with the process for the production of ethyl chloride so that the ethyl chloride can be produced directly from the ethylene containing gases, as coke-gases, brown-coal gases and the like, in a cheap manner and with theoretical output.

The formation of the ethyl chloride from the chlorsulphonic ethyl ester by means of hydrochloric acid takes place in the desired manner already if the ester is slightly heated with ordinary concentrated hydrochloric acid. And this can be done in open or in closed vessels.

*Examples.*

1. In a vessel having a stirring device and being connected with a descending condenser, 1.5 parts of concentrated hydrochloric acid of approximately 25 to 32% contents in HCl (equal to an acid of 16–20° Bé.) are slowly admixed while stirring to one part of the chlorsulphonic ethyl ester, whereupon the temperature is gradually increased to 100° C., the reaction liquid being maintained at this temperature for about 1 to 2 hours up to the termination of the reaction. The ethyl chloride produced distills off during this period in a uniform flow and it is condensed by the descending condenser which is preferably filled with a freezing mixture or with a deeply cooled liquid.

2. Dry coke-open gases, which have been freed from benzene and eventually from tar and ammonia as well as from sulphuretted hydrogen and which contain about two or under certain circumstances also more volumes of ethylene in 100 volumes of gas, are led at ordinary temperature (preferably at a temperature between 0° and 20° C.) through an apparatus wherein the gas comes in contact with a spray of chlorsulphonic acid. The ethylene contained in the coke-oven gases is thus completely absorbed by the chlorsulphonic acid. The product of reaction consists for about 80 to 95% of chlorsulphonic ethyl ester.

A mixture of about 1 part of this chlorsulphonic ethylester with 1.5 parts of fuming hydrochloric acid is heated for about an hour in the autoclave to 100° C. The ester has disappeared after this period, the ethyl chloride separates when cooling on the surface of the aqueous mixture of hydrochloric acid and sulphuric acid and can be drawn off.

The output in ethyl chloride corresponds approximately to the theoretical output.

Having now particularly described and ascertained the nature of my said invention, I declare that what I claim is:—

1. A process for the production of ethyl chloride consisting in treating chlorsulphonic ethylester with hydrochloric acid.

2. A process for the production of ethyl chloride consisting in treating chlorsulphonic ethylester with concentrated hydrochloric acid and isolating the ethyl chloride thus produced.

3. A process for the production of ethyl chloride consisting in heating chlorsulphonic ethylester with concentrated hydrochloric acid and isolating the ethyl chloride thus produced.

In testimony whereof I have hereunto set my hand in presence of two subscribing witnesses.

WILHELM TRAUBE.

Witnesses:
CHARLES L. TURRILL,
E. HOLTZERMAN.